US008853285B2

(12) United States Patent
Kim et al.

(10) Patent No.: US 8,853,285 B2
(45) Date of Patent: Oct. 7, 2014

(54) POLYMER ELECTROLYTE MEMBRANE CHEMICALLY BONDED WITH IONIC LIQUID AND FUEL CELL USING THE SAME

(71) Applicants: Hyundai Motor Company, Seoul (KR); Postech Academy-Industry Foundation, Gyeongsangbuk-Do (KR)

(72) Inventors: Young Teak Kim, Incheon (KR); In Chul Hwang, Seoul (KR); Nak Hyun Kwon, Seoul (KR); Moon Jeong Park, Gyeongbuk (KR); Jae Wan Hong, Pohang (KR)

(73) Assignees: Hyundai Motor Company, Seoul (KR); Postech Academy-Industry Foundation, Pohang, Gyeongsangbuk-Do (KR)

( * ) Notice: Subject to any disclaimer, the term of this patent is extended or adjusted under 35 U.S.C. 154(b) by 0 days.

(21) Appl. No.: 13/687,740

(22) Filed: Nov. 28, 2012

(65) Prior Publication Data

US 2014/0024729 A1    Jan. 23, 2014

(30) Foreign Application Priority Data

Jul. 23, 2012   (KR) .................. 10-2012-0080160

(51) Int. Cl.
*C08J 5/20*        (2006.01)
*C08F 36/00*       (2006.01)
*H01M 8/10*        (2006.01)
*C08J 5/22*        (2006.01)

(52) U.S. Cl.
CPC .......... *H01M 8/1072* (2013.01); *H01M 8/1023* (2013.01); *C08J 5/22* (2013.01); *Y02E 60/521* (2013.01)

USPC .......................................... 521/27; 525/332.9

(58) Field of Classification Search
CPC ........................ H01M 8/1072; H01M 8/1023
USPC .......................................... 521/27; 525/332.9
See application file for complete search history.

(56) References Cited

U.S. PATENT DOCUMENTS

| | | |
|---|---|---|
| 5,216,115 A | 6/1993 | Kohn et al. |
| 6,936,365 B2 | 8/2005 | Hobson et al. |
| 7,538,169 B2 | 5/2009 | Hobson et al. |

FOREIGN PATENT DOCUMENTS

| | | | |
|---|---|---|---|
| JP | 2001-026573 A | | 1/2001 |
| JP | 2005-149989 A | | 6/2005 |
| KR | 10-1119532 B1 | | 2/2012 |
| KR | 1119532 B1 | * | 2/2012 |

* cited by examiner

*Primary Examiner* — Michael M Bernshteyn
(74) *Attorney, Agent, or Firm* — Edwards Wildman Palmer LLP; Peter F. Corless

(57) ABSTRACT

The present disclosure provides a polymer electrolyte membrane chemically bonded with an ionic liquid. More particularly, the present disclosure provides a polymer electrolyte membrane chemically bonded with an ionic liquid by reacting the ionic liquid with a novel polymer chain terminal. The polymer electrolyte membrane described herein has a high hydrogen ionic conductivity, even in a high-temperature and anhydrous environment. Additionally, the membrane displays electro-chemical and thermal stability. Moreover, the polymer electrolyte membrane may also be applied to a high-temperature and dry-out bio fuel cell.

17 Claims, 7 Drawing Sheets

POLYMER ELECTROLYTE MEMBRANE CHEMICALLY BONDED WITH IONIC LIQUID AND FUEL CELL USING THE SAME

CROSS-REFERENCE TO RELATED APPLICATION

This application claims under 35 U.S.C. §119(a) the benefit of Korean Patent Application No. 10-2012-0080160, filed on Jul. 23, 2012, the entire contents of which are incorporated herein by reference.

BACKGROUND (a) Technical Field

The present invention relates to a polymer electrolyte membrane bonded with an ionic liquid by chemical reaction of the ionic liquid with a novel polymer chain terminal, and a fuel cell using the polymer electrolyte membrane.

(b) Background Art

Hydrogen conductive polymers have been widely studied for use in a polymer exchange fuel cell (PEFC), which supplies an environmentally friendly (e.g., eco-friendly) source of energy. One of the main problems for the development of hydrogen-conductive polymer technology is the ability to produce a hydrogen-conductive polymer that has long-term stability and durability. Unfortunately, the stability and durability of such polymers is negatively impacted by a variety of factors, including: carbon monoxide pollution occurring in a platinum catalyst, complexity in heat and water control systems, moisture maintenance in a polymer electrolyte, and improvement of reaction speed in an electrode.

The simplest approach to solve the foregoing problems is to improve the operating temperature of the PEFC. It is well known that carbon monoxide pollution in an electrode decreases to the ignorable level as operating temperature increases. However, such an increased operating temperature is higher than, or equal to, the boiling point of water, which requires a low humidification condition. Therefore, there is a need to develop a system in which a new hydrogen conductor having a high boiling point and non-volatile property is introduced in place of water.

At present, Nation® (DuPont) is mostly used as a polymer membrane of a polymer electrolyte fuel cell that operates at temperatures in the range of 60-80° C. Nation® is a sulfonated tetrafluoroethylene based fluoropolymer-copolymer, which is a synthetic polymer with ionic properties (e.g., ionomers). Similar polymer membranes may include, for example, Flemion® (Asahi Glass), Aciplex® (Asahi Kasei), etc., however, such polymer membranes are not commercially viable for use in a fuel cell-based application because of their prohibitively expensive price.

In order to reduce cost, a hydrocarbon-based electrolyte that introduces a sulfonic acid group or phosphonic acid group to a polymer having superior thermal stability and mechanical strength has been developed and actively studied. For example, aromatic polyether, which is a representative, attractively priced engineering plastic, is a polymer in which a phenylene ring is Connected to an oxygen atom, is. The aromatic polyester in its humidified state shows high hygroscopic property and high hydrogen conductivity. Unfortunately, at high temperature its performance significantly degrades due to the evaporation of water.

As to a conventional polymer electrolyte fuel cell, one suggested conventional art solution proposes a fuel cell consisting of an electrolyte membrane including an ionic conductive film between a nitrogen-containing compound, which contains histamine, and an ionic conductive polymer. Another suggested conventional art solution proposes a fuel cell asymmetric membrane that is a complex of polyarylene having a sulfonic acid group and a nitrogen-containing compound (histamine). However, the foregoing proposed solutions have the disadvantage of extremely low mechanical strength and/or leakage of the nitrogen-containing compounds from the polymer electrolyte membrane during the course of long-term use of the soaked nitrogen-containing compound.

Recently, as part of an effort to develop a polymer electrolyte substance operable in an anhydrous/high temperature environment, the present inventors have measured conductivities of various types of ionic liquids soaked in the PSS-PMB polymer electrolyte. By using alkylimidazole salt having high thermal stability, it has been found that various nano structures are formed according to a molecular weight of a polymer and a type and a relative content of a soaked ionic liquid. Moreover, the conductivity of the resulting nano structures vary largely depending upon the type of the nano structure.

By discovering such a correlation, with different molecular weights and degrees of sulfonation of block copolymers and different types and soaking of ionic liquids, conductivities were measured and correlations among them were also investigated, resulting in a high conductivity of 0.045 S/cm which is the highest conductivity level known to occur at a high temperature of 165° C. For example, such a conductivity level is three times greater than the conductivity of Nafion®, which has a maximum conductivity of 0.014 S/cm at 165° C. Disadvantageously, this system experiences significant degradation of mechanical strength because the soaked ionic liquid absorbs moisture in a humidified environment, which causes the soaked ionic liquid to leak out of the electrolyte membrane.

SUMMARY OF THE DISCLOSURE

The present invention provides a polymer electrolyte membrane bonded with an ionic liquid through chemical reaction of the ionic liquid with a novel polymer chain terminal, which provides high hydrogen ionic conductivity and electric-chemical and thermal stability in an anhydrous/high-temperature environment. Accordingly, the present invention provides a polymer electrolyte membrane having superior electro-chemical and thermal stability in an anhydrous/high-temperature environment.

The present invention also provides a block copolymer for a poly(styrene-block-2-histamine methylbutylene formate) polymer electrolyte membrane, the poly being a novel polymer chain.

The present invention also provides a fuel cell using the polymer electrolyte membrane.

In one aspect, the present invention provides a polymer electrolyte membrane bonded by chemically reacting a block copolymer represented by the Chemical Formula 1 and an ionic liquid containing a fluorine-containing anion and an imidazolium salt cation, the ionic liquid represented by the Chemical Formula 2,

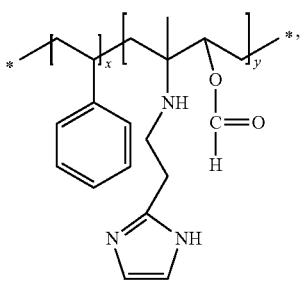

(1)

wherein x is 10-1000, and y is 10-1000, and

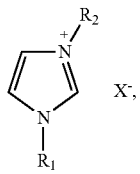

(2)

wherein $R_1$ and $R_2$ are independently hydrogen and a $C_1$-$C_{30}$ alkyl group, and $X^-$ is selected from the group consisting of $BF_4^-$, $PF_6^-$, $C_2F_6NO_4S^-$, $Cl^-$, $OH^-$, $Br^-$ and $CF_3SO_3^-$.

In another aspect, the present invention also provides a block copolymer for a poly(styrene-block-histamine methylbutylene formate) polymer electrolyte membrane represented by the Chemical Formula 1:

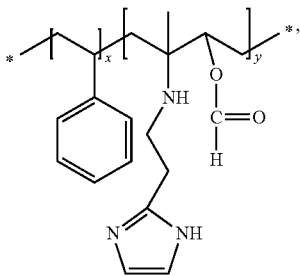

(1)

wherein x is 10-1000, and y is 10-1000.

In another aspect, the present invention also provides a fuel cell including the polymer electrolyte membrane.

Other aspects and preferred embodiments of the invention are discussed infra.

BRIEF DESCRIPTION OF THE DRAWINGS

The above and other features of the present invention will now be described in detail with reference to an exemplary embodiment thereof illustrated by the accompanying drawings, which are given hereinbelow by way of illustration only, and thus are not limitative of the present invention, and wherein.

Figure 1:
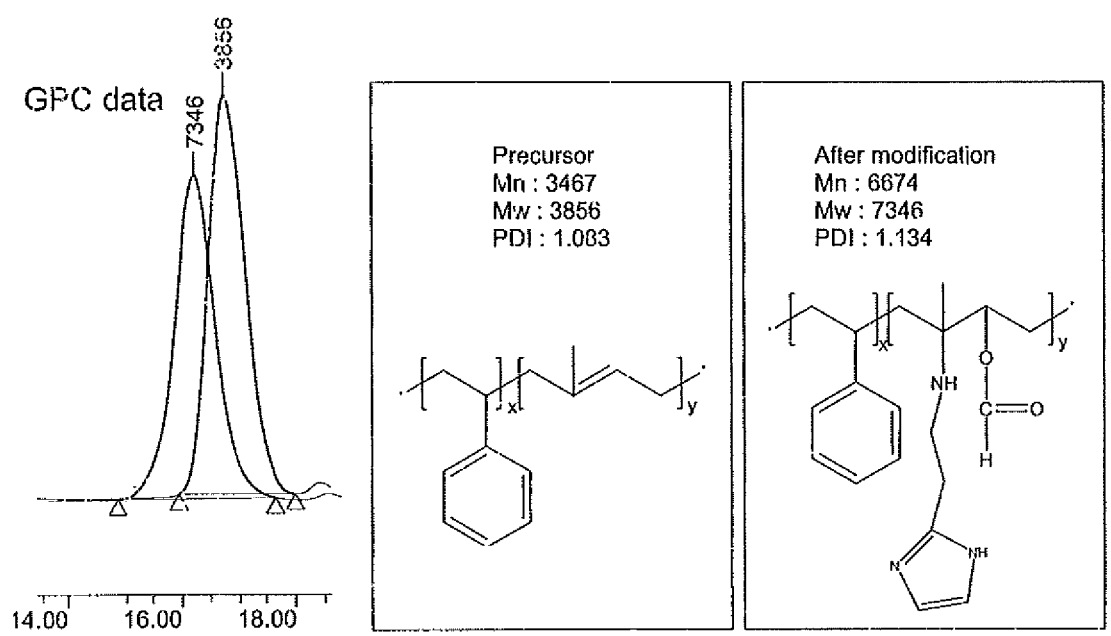
FIG. 1 is a gel permeation chromatography (GPC) graph of a polymer electrolyte membrane manufactured according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter, an exemplary embodiment of the present invention will be described in detail with reference to the accompanying drawings to allow those of ordinary skill in the art to easily carry out the present invention. While the invention will be described in conjunction with the exemplary embodiment, it will be understood that present description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims. Hereinbelow, the present invention will be described in more detail with an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention provides a polymer electrolyte membrane bonded by chemically reacting:

a block copolymer represented by the Chemical Formula 1; and an ionic liquid containing a fluorine-containing anion and an imidazolium salt cation, the ionic liquid represented by the Chemical Formula 2,

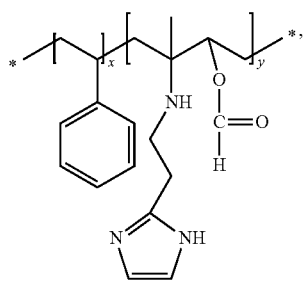
(1)

wherein x is 10-1000, and y is 10-1000, and

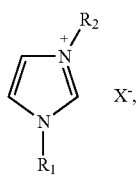
(2)

wherein $R_1$ and $R_2$ are independently hydrogen and a $C_1$-$C_{30}$ alkyl group, and $X^-$ is selected from the group consisting of $BF_4^-$, $PF_6^-$, $C_2F_6NO_4S^-$, $Cl^-$, $OH^-$, $Br^-$ and $CF_3SO_3^-$.

According to an exemplary embodiment of the present invention, the polymer electrolyte membrane may comprise the ionic liquid in an amount of 30 to 50 parts by weight with respect to 100 parts by weight of the block copolymer. If the polymer electrolyte membrane comprises the ionic liquid in an amount of 30 parts by weight or less with respect to the block copolymer, the ionic conductivity may be too low. On the other hand, if the ionic liquid is present in an amount of 50 parts by weight or more, the mechanical strength of the electrolyte membrane may be too low.

In addition, the present invention also includes a block copolymer for a poly(styrene-block-histamine methylbutylene formate) polymer electrolyte membrane represented by the Chemical Formula 1, as a medium of the polymer electrolyte membrane,

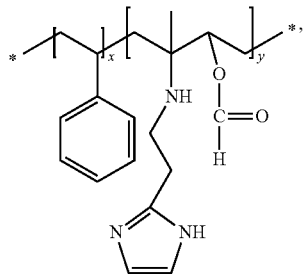
(1)

wherein x is 10-1000, and y is 10-1000.

According to an exemplary embodiment of the present invention, the block copolymer has excellent durability due to chemical bonding of histamine to styrene having high mechanical strength (Young's modulus =2 GPa).

For the block copolymer, hydrogen peroxide ($H_2O_2$) and a formic acid (HCOOH) may be added to poly(styrene-block-isoprene) (polymer 1) and are stirred for 7 hours at 50° C., such that poly(styrene-block-2-hydroxy methylbutylene formate) (polymer 2) may be obtained. The poly(styrene-block-2-hydroxy methylbutylene formate) (polymer 2) may be stirred in an organic solvent and then histamine may be added thereto so that a block copolymer for a poly(styrene-block-2-histamine methylbutylene formate) (polymer 3) polymer electrolyte membrane may be manufactured.

The present invention also includes a fuel cell including the polymer electrolyte membrane.

Therefore, by manufacturing the polymer electrolyte membrane bonded with an ionic liquid, through chemical reaction of the ionic liquid to a novel polymer chain terminal, a high hydrogen ionic conductivity may be achieved even in a high-temperature and anhydrous environment. Additionally, the electro-chemical and thermal stability of the resulting membrane is excellent. Moreover, the polymer electrolyte membrane may also be applied to a high-temperature and dry-out bio fuel cell.

Hereinafter, the present invention will be described in more detail based on the embodiment, without being limited by the following embodiment.

Manufacturing Example: Synthesis of Block Copolymer $CHCl_3$ of 1g/25ml was added to poly(styrene-block-isoprene) (polymer 1) and dissolved. Thereafter, $H_2O_2$ of 1g/2ml and HCOOH of 1g/25ml were added and stirred for 7 hours at 50° C., thus obtaining poly(styrene-block-2-hydroxy methylbutylene formate) (polymer 2). The poly(styrene-block-2-hydroxy methylbutylene formate) (polymer 2) was added to DMF/THF (1:10) and dissolved, and then cooled to 0° C., after which triethylamine (Et3N) (1.4eq) of 1.4ml was added and stirred for 10 minutes. Thereafter, ethyl chloroformate (ECF) (1.2eq) of 0.8ml was added to the solution and stirred for 10 minutes at 0° C., and then continuously stirred for 30 minutes at 25° C. After the reagent was filtered, 5ml of dimethyl formamide (DMF), in which histamine (1.1eq) of 0.8g was dissolved, was added to the filtered reagent and mixed. The reaction mixture was stirred for 30 hours, thus obtaining poly(styrene-block-2-histamine methylbutylene formate) block copolymer (polymer 3). The foregoing reaction mechanism is expressed by Reaction Formula (refer to FIGS. 1 and 2):

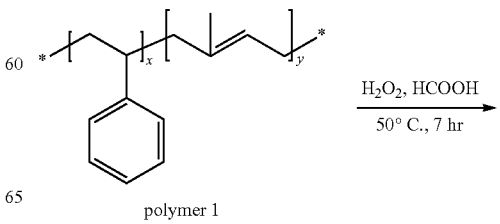

polymer 1

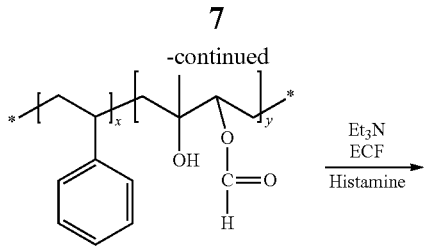

-continued polymer 2

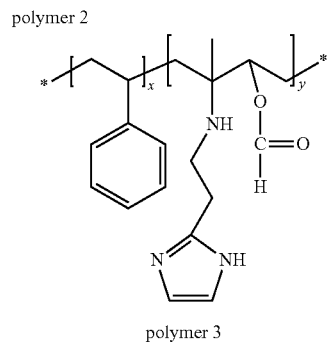

polymer 3 wherein
x and y indicate degrees of polymerization of each polymer chain

EXAMPLE

Manufacturing of Polymer Electrolyte Membrane 30 parts by weight of imidazole of the ionic liquid having various anions (e.g., $BF_4^-$, $PF_6^-$) acting as a bronstead acid was dissolved in THF(tetrahydrofuran, >99%)/MeOH and doped, after which 70 parts by weight of poly(styrene-block-2-histamine methylbutylene formate) (polymer 3) manufactured in Manufacturing Example was mixed using the mixing solution and then stirred for 24 hours at room temperature. After the solvent was entirely removed from the solution at room temperature in the existence of argon (Ar), the solution was vacuum-dried for 10 days at 50° C., thereby manufacturing a polymer electrolyte membrane chemically bonded with the ionic liquid.

COMPARATIVE EXAMPLE

Manufacturing of Polymer Electrolyte Membrane

The polymer electrolyte membrane was manufactured in the same manner as the foregoing embodiment with the exception that the terminus of poly(styrene-block-2-histamine methylbutylene formate), which is a general polymer chain, was doped with CH3SO3-by using methane sulfonate (hereinafter, "[MS]" for short, >99% HPLC grade from Sigma Aldrich) as the ionic liquid.

EXPERIMENTAL EXAMPLE 1

Structural Analysis of Compound Manufactured by Embodiment

Figure 2:
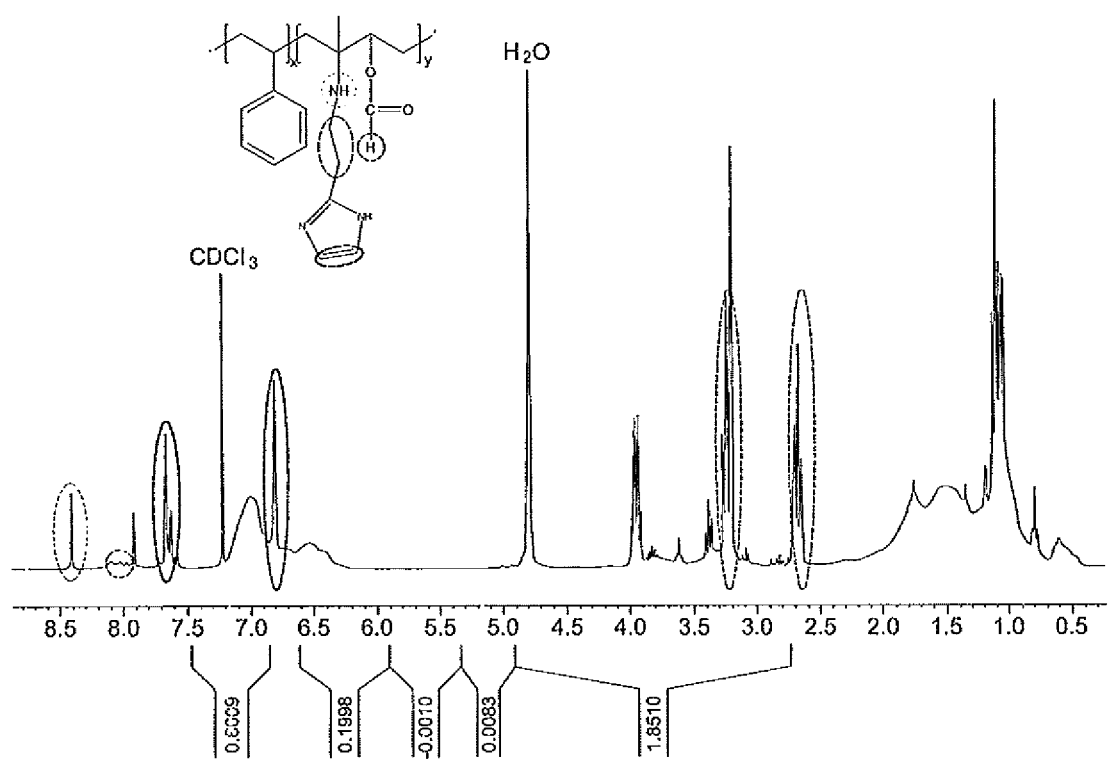
FIG. 2 is an NMR spectrum graph of poly(styrene-block-2-histamine methylbutylene formate) manufactured according to an exemplary embodiment of the present invention.

The molecular weight and molecular formula of the compound obtained in the foregoing embodiment were determined using a high-performance liquid chromatography (HPLC) analyzer, and identification of the structure of the compound was performed by analyzing a $^1H$ NMR spectrum through nuclear magnetic resonance analysis (Bruker AMX 500) (see FIG. 2).

[Chemical Name] poly (stryele-block-2-histamine methylbutylene formate)
Molecular Weight: 7.3 kg/mol (3.8-block-3.5 kg/mol)
Molecular Formula: poly(styrene-block-2-histamine methylbutylene formate)
$^1H$-NMR (500 MHz, $CDCl_3$) δ 2.7 & 3.3 ppm ($CH_2$ linker), 6.7 & 7.2 ppm (histamine ring), 8.1 ppm (OOOH), 8.4 ppm (NH)

EXPERIMENTAL EXAMPLE 2

Small-Angle X-Ray Scattering (SAXS) Measurement

The SAXS experiment was conducted in a 4Cl SAX beam line of a Pohang Light Source (PLS). For the polymer electrolyte membranes manufactured by Embodiment and Comparative Example, small-angle X-ray scattering data was measured in the condition of Ar and room temperature.

Figure 3:
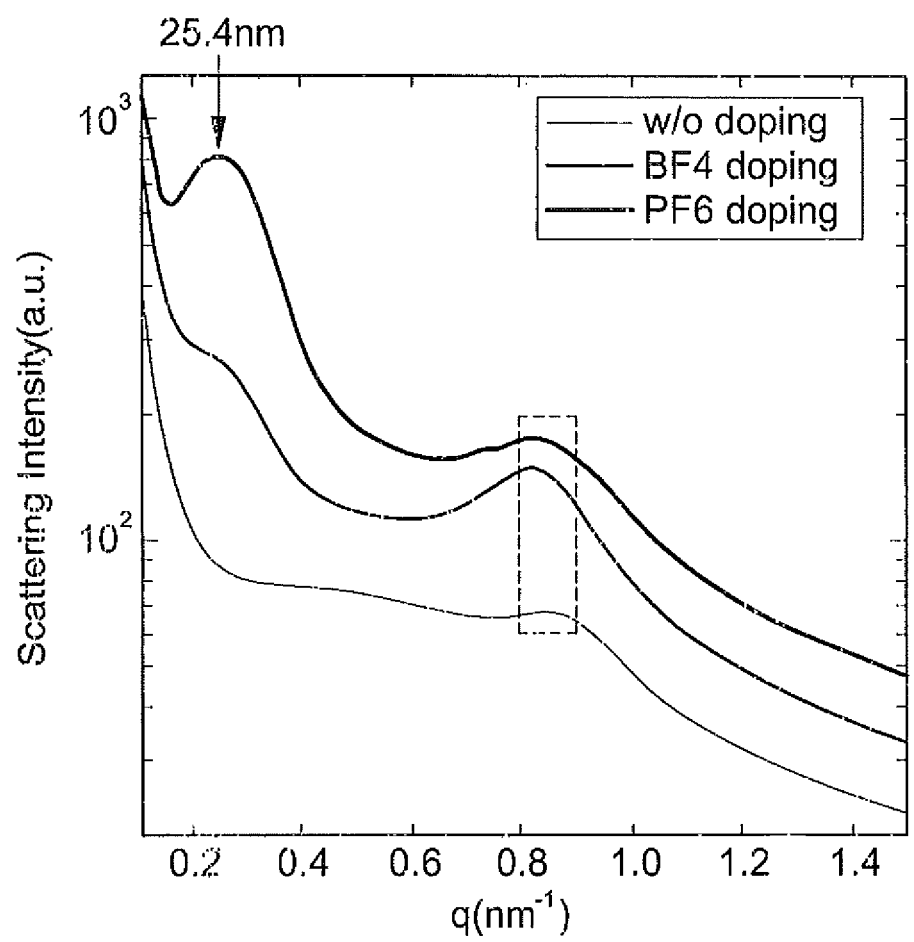
FIG. 3 is a small-angle X-ray scattering graph showing formation of a nano structure after anion doping of an example synthesized polymer electrolyte.
Figure 4:
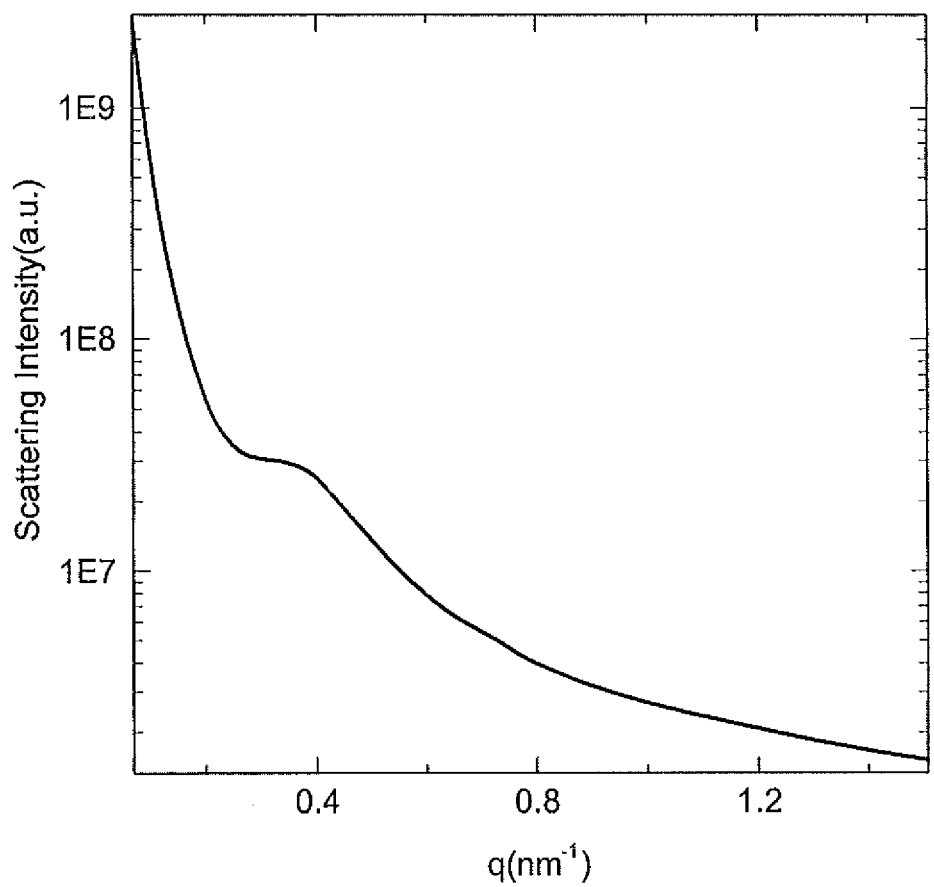
FIG. 4 is a small-angle X-ray scattering graph showing formation of a nano structure of a polymer electrolyte membrane manufactured by a comparative example according to the present invention.

As shown in FIG. 3, the polymer electrolyte membranes manufactured by Embodiment and Comparative Example have particular nano structures with periods of 7.5 nm and 25.4 nm, respectively, at room temperature. 25.4 nm shows the periodicity of a lamella in a plate shape and 7.5 nm indicates a size of an ionic domain formed by histamine. This means that the histamine forms re-ordered arrangement in the polymer's nano structure (see FIGS. 3 and 4).

The order of the lamella structure progressively increased in the experimental series of w/o doping, BF4 doping, and PF6 doping, respectively. Accordingly, it may be seen that hydrophobic anions are involved in the formation of the nano structure. In other words, when the ion is not doped, a Flory-Huggins interaction parameter inducing phase separation of a poly(styrene-block-2-histamine methylbutylene formate) polymer bonded with histamine at the polymer chain terminal thereof is relatively small, so that a clear microphase may not be formed (disorder); but as the anion is doped, histamine is cationized, such that the Flory-Huggins interaction parameter increases, inducing formation of the well-ordered lamella structure. The Flory-Huggins interaction parameter in the disorder and lamellar structure phase boundary known in classic block copolymer thermodynamics is 10.5, and for this reason, in this study, the Flory-Huggins interaction parameter becomes larger than 10.5 by anion doping.

EXPERIMENTAL EXAMPLE 3

Measurement of Hydrogen Ionic Conductivity

The hydrogen ionic conductivities of the polymer electrolyte membranes manufactured according to Embodiment and Comparative Example were measured using alternating-current (AC) impedance spectroscopy. A through-plane hydrogen ionic conductivity was measured using two electrode cells of a stainless steel blocking electrode having a size of 1.25 cm×1.25 cm and a Pt operating electrode/relative electrode having a size of 1 cm×1 cm.

Figure 5:
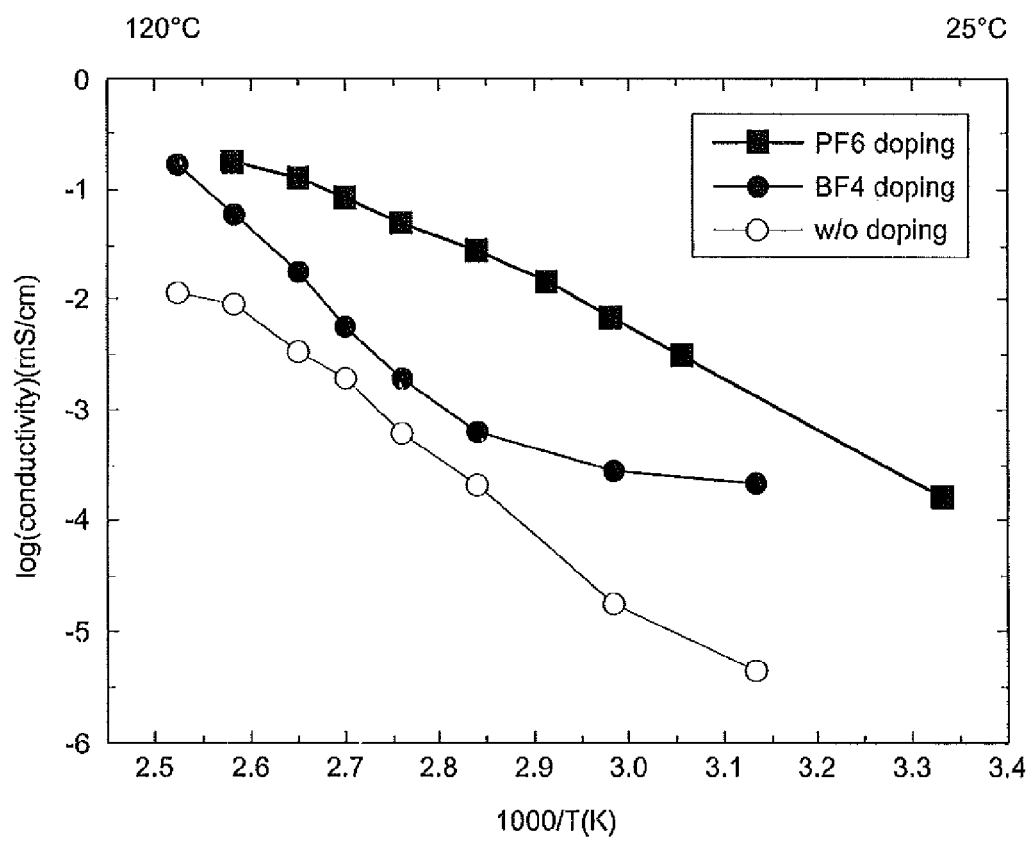
FIG. 5 is a hydrogen ionic conductivity graph in an anhydrous environment of a polymer electrolyte membrane manufactured according to an exemplary embodiment of the present invention.

As a result, the hydrogen ionic conductivities of the polymer electrolyte membranes manufactured according to Embodiment and Comparative Example were obtained as 0.2 mS/cm and 3-5 mS/cm, respectively, with different anion types, at 120° C. in an anhydrous environment, and those values are larger than conductivity values in an anhydrous environment, which were obtained in a system chemically bonded with an ionic liquid. In particular, the conductivity of the obtained hydrogen ionic corresponds well with the degree of order of the nano structure (see FIGS. 5, 6, and 7).

The poly(styrene-block-2-histamine methylbutylene formate) block copolymer manufactured as described above is thermally and chemically stable at a high temperature of 180° C. To maximize the hydrogen ionic conductivity of the block copolymer, $BF_4^-$ having hydrophilic property and $PF_6^-$ having hydrophobic property were doped, after which the influence upon the hydrogen ionic conductivity and durability were evaluated, resulting in a hydrogen ionic conductivity of 0.2 mS/cm of the anion-doped polymer electrolyte membrane at an operating temperature of 120° C. in an anhydrous environment, and a stable hydrogen conductivity even in continuous measurement for 300 hours or more.

Figure 6:
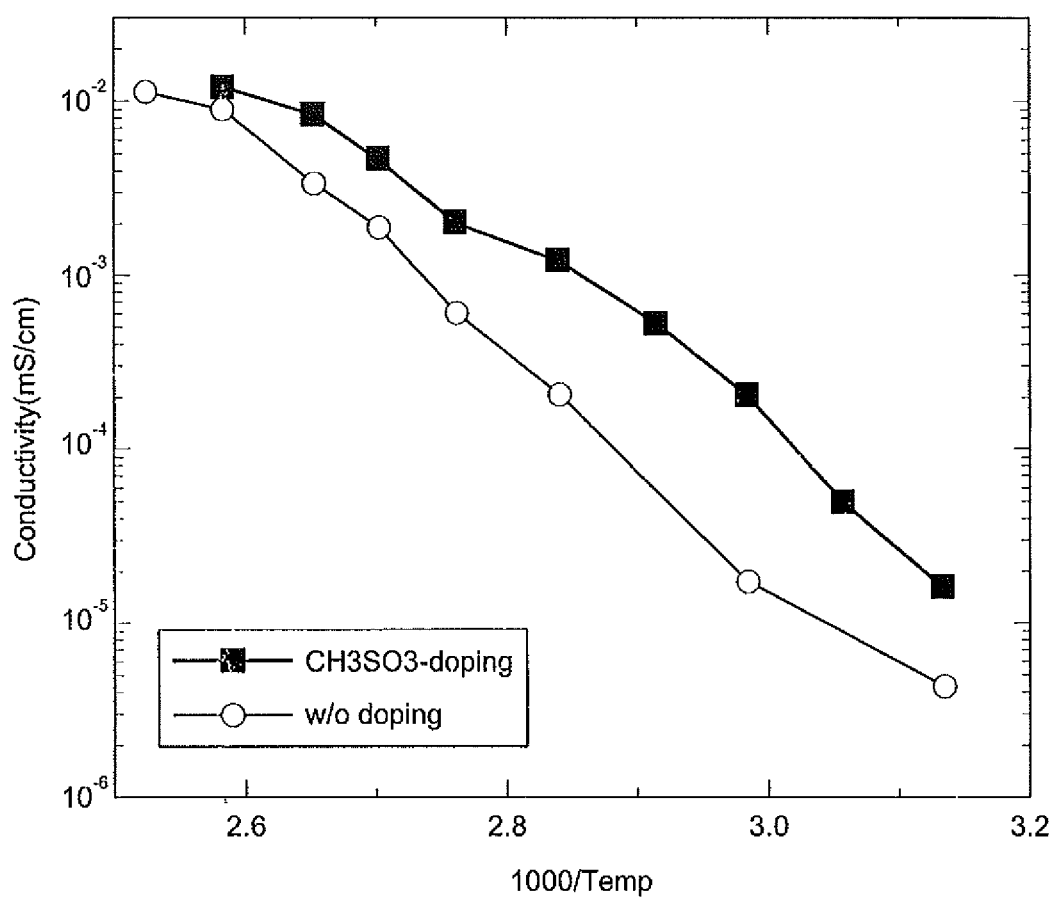
FIG. 6 is a hydrogen ionic conductivity graph in an anhydrous environment of a an example polymer electrolyte membrane manufactured by a comparative example according to the present invention.
Figure 7:
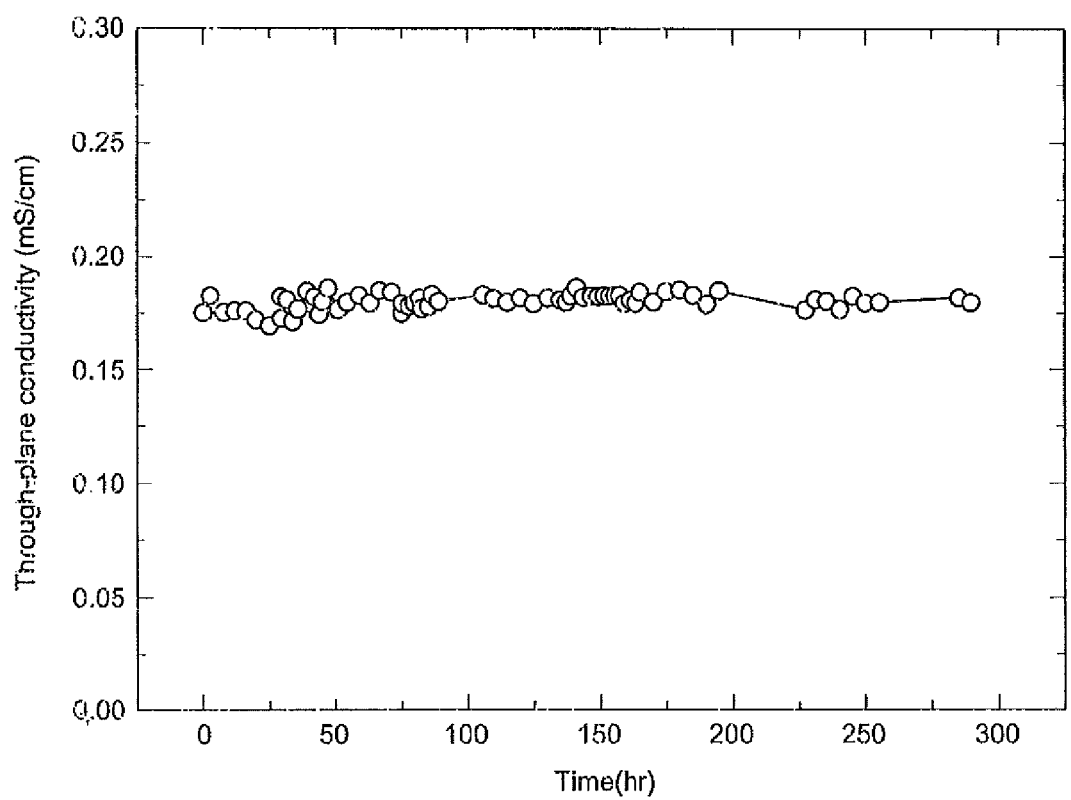
FIG. 7 is a hydrogen ionic conductivity graph measured for 320 hours at 120° C. in a polymer electrolyte membrane manufactured according to an exemplary embodiment of the present invention.

On the other hand, in the case of structural analysis and conductivity measurement of the electrolyte membrane using CH3SO3—as an anion according to Comparative Example, as can be seen in FIG. 6, despite the presence of the anion, the microphase was not formed at all, and the conductivity value was not quite improved when compared to the w/o doping case in which the ion was not soaked, resulting in a maximum conductivity of only 0.01 mS/cm. Therefore, it can be seen that an effective way to obtain a high hydrogen conductivity is making a path of ion conduction in nanometer units by forming the microphase.

According to the present invention, by manufacturing a polymer electrolyte membrane bonded with an ionic liquid through chemical reaction of the ionic liquid to a novel polymer chain terminal, a high hydrogen ionic conductivity may be obtained even in a high-temperature and anhydrous environment, and the electro-chemical and thermal stability of the resulting membrane are excellent. Moreover, the polymer electrolyte membrane may also be applied to a high-temperature and dry-out bio fuel cell.

While an exemplary embodiment of the present invention has been described in detail, the protection scope of the present invention is not limited to the foregoing embodiment and it will be appreciated by those skilled in the art that various modifications and improvements using the basic concept of the present invention defined in the appended claims are also included in the protection scope of the present invention.

What is claimed is:

1. A compound of Formula 1:

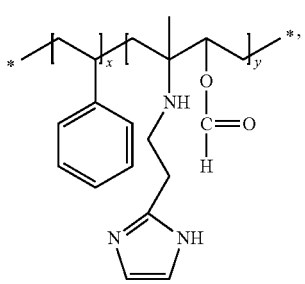

(1)

wherein x ranges from about 10 to about 1000, and y ranges from about 10 to about 1000.

2. The compound of claim 1, wherein x ranges from about 10 to about 100, and y ranges from about 10 to about 100.

3. The compound of claim 1, wherein x ranges from about 10 to about 500, and y ranges from about 10 to about 500.

4. The compound of claim 1, wherein x ranges from about 100 to about 500, and y ranges from about 100 to about 500.

5. The compound of claim 1, wherein x ranges from about 100 to about 750, and y ranges from about 100 to about 750.

6. The compound of claim 1, wherein x ranges from about 500 to about 750, and y ranges from about 500 to about 750.

7. The compound of claim 1, wherein x ranges from about 500 to about 1000, and y ranges from about 500 to about 1000.

8. The compound of claim 1, wherein x ranges from about 750 to about 1000, and y ranges from about 750 to about 1000.

9. A method of making a polymer electrolyte membrane, comprising:

reacting the compound of claim 1 with an ionic liquid of Formula 2,

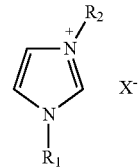

(2)

wherein $R_1$ and $R_2$ are independently hydrogen and $C_1$-$C_{30}$ alkyl group, and $X^-$ is one or more selected from $BF_4^-$, $PF_6^-$, $C_2F_6NO_4S^-$, $Cl^-$, $OH^-$, $Br^-$ and $CF_3SO_3^-$.

10. The ionic liquid of claim 9, wherein $X^-$ is $BF_4^-$.

11. The ionic liquid of claim 9, wherein $X^-$ is $PF_6^-$.

12. The ionic liquid of claim 9, wherein $X^-$ is $C_2F_6NO_4S^-$.

13. The ionic liquid of claim 9, wherein $X^-$ is $Cl^-$.

14. The ionic liquid of claim 9, wherein $X^-$ is $OH^-$.

15. The ionic liquid of claim 9, wherein $X^-$ is $Br^-$.

16. The ionic liquid of claim 9, wherein $X^-$ is $CF_3SO_3^-$.

17. A fuel cell comprising the polymer electrolyte membrane of claim 9.

* * * * *